United States Patent
Morinaga et al.

(10) Patent No.: US 10,386,473 B2
(45) Date of Patent: Aug. 20, 2019

(54) RADAR APPARATUS USING CHIRP WAVE AND SIGNAL PROCESSING METHOD OF RADAR APPARATUS

(71) Applicant: DENSO CORPORATION, Kariya, Aichi-pref. (JP)

(72) Inventors: Mitsutoshi Morinaga, Kariya (JP); Kazuma Natsume, Kariya (JP); Hideki Kitagawa, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 345 days.

(21) Appl. No.: 15/318,309

(22) PCT Filed: Jun. 11, 2015

(86) PCT No.: PCT/JP2015/066912
§ 371 (c)(1),
(2) Date: Dec. 12, 2016

(87) PCT Pub. No.: WO2015/190565
PCT Pub. Date: Dec. 17, 2015

(65) Prior Publication Data
US 2017/0115386 A1 Apr. 27, 2017

(30) Foreign Application Priority Data
Jun. 13, 2014 (JP) .................. 2014-122437

(51) Int. Cl.
*G01S 13/34* (2006.01)
*G01S 13/58* (2006.01)
(Continued)

(52) U.S. Cl.
CPC ............ *G01S 13/584* (2013.01); *G01S 7/352* (2013.01); *G01S 13/34* (2013.01); *G01S 13/341* (2013.01);
(Continued)

(58) Field of Classification Search
CPC ...... G01S 13/34; G01S 13/341; G01S 13/343; G01S 13/345; G01S 13/53; G01S 13/584;
(Continued)

(56) References Cited

U.S. PATENT DOCUMENTS 4,914,441 A * 4/1990 Brookner ................ G01S 13/22
342/161
8,436,763 B2 5/2013 Wintermantel
(Continued)

FOREIGN PATENT DOCUMENTS

JP 2011-526370 A 10/2011
JP 2012-242288 A 12/2012

*Primary Examiner* — Timothy A Brainard
(74) *Attorney, Agent, or Firm* — Knobbe, Martens, Olson & Bear, LLP (57) ABSTRACT

A radar apparatus includes a first processing unit, a second processing unit, and a speed determining unit. Of these units, the first processing unit determines at least speed including ambiguity caused by phase folding back within a predetermined speed measurement range, from phase rotation of frequency components detected in time-series for a same target, using a beat signal obtained by transmitting and receiving, a plurality of times, a predetermined first modulation wave. The second processing unit determines at least speed that is uniquely determined within the speed measurement range, from Doppler frequency included in frequency components indicating a target, using a beat signal obtained by transmitting and receiving a predetermined second modulation wave. The speed determining unit determines a measurement result for speed expressed by a resolution obtained by the first processing unit by comparing a calculation result of the first processing unit and a calculation result of the second processing unit.

9 Claims, 6 Drawing Sheets (51) Int. Cl.
*G01S 13/53* (2006.01)
*G01S 7/35* (2006.01)
*G01S 13/93* (2006.01)

(52) U.S. Cl.
CPC .......... *G01S 13/343* (2013.01); *G01S 13/345* (2013.01); *G01S 13/53* (2013.01); *G01S 13/931* (2013.01); *G01S 2007/356* (2013.01); *G01S 2013/9342* (2013.01); *G01S 2013/9346* (2013.01)

(58) Field of Classification Search
CPC ............. G01S 13/931; G01S 2007/356; G01S 2013/9342; G01S 2013/9346; G01S 7/352
USPC ....................................................... 342/112
See application file for complete search history.

(56) References Cited

U.S. PATENT DOCUMENTS

| | | |
|---|---|---|
| 2005/0285773 A1 | 12/2005 | Hartzstein et al. |
| 2009/0085800 A1 | 4/2009 | Alland et al. |
| 2011/0074620 A1 | 3/2011 | Wintermantel |
| 2011/0074621 A1 | 3/2011 | Wintermantel |
| 2011/0080313 A1 | 4/2011 | Wintermantel |

* cited by examiner

(a) SECOND MODULATION OUTPUT (b) FIRST MODULATION OUTPUT (c) CLOSEST TO SPEED IN SECOND MODULATION OUTPUT

RADAR APPARATUS USING CHIRP WAVE AND SIGNAL PROCESSING METHOD OF RADAR APPARATUS

CROSS-REFERENCE TO RELATED APPLICATION

This application is a U.S. National Phase Application under 35 U.S.C. 371 of International Application No. PCT/JP2015/066912 filed on Jun. 11, 2015 and published in Japanese as WO 2015/190565 A1 on Dec. 17, 2015. This application is based on and claims the benefit of priority from Japanese Patent Application No. 2014-122437, filed Jun. 13, 2014. The entire disclosures of all of the above applications are incorporated herein by reference.

TECHNICAL FIELD

The present invention relates to a radar apparatus that uses a chirp wave and a signal processing method of the radar apparatus.

BACKGROUND ART

Radar apparatuses are currently used in various fields. A fast chirp modulation (FCM)-type radar apparatus is known as one such radar apparatus. This radar apparatus uses a chirp wave of which the frequency continuously increases or decreases, as a radar wave. Furthermore, this radar apparatus measures distance and speed by performing a two-dimensional fast Fourier transformation (FFT) with respect to a beat signal generated from transmission and reception signals thereof. In the FCM scheme, a distance to a target is determined from the frequency of the beat signal generated from the transmission and reception signals. In addition, in the FCM scheme, a relative speed to the target (also referred to, hereafter, as simply speed) is determined from phase rotation of a frequency component continuously detected regarding the same target. However, the speed determined from phase rotation includes ambiguity caused by phase folding back in which when a detected phase is θ, the actual phase may be θ+2π·n (n being an integer) and therefore cannot be identified.

Regarding the foregoing, a technology is proposed in which the ambiguity in the detected speed (that is, speed ambiguity: synonymous with the above-described ambiguity caused by phase folding back) is reduced by sampling of the beat signal being performed at a high speed (refer to PTL 1). That is, to reduce the ambiguity in the speed, a cycle period of the chirp wave is required to be shortened. To do so, the duration of each individual chirp is shortened, while increasing the slope (rate of change) of the frequency in the chirp wave and ensuring a variation width of the frequency. Furthermore, to ensure the number of samplings required for a frequency analyzing process during the shortened period, a higher speed for sampling is required.

CITATION LIST

Patent Literature

[PTL 1] U.S. Pat. No. 8,436,763

SUMMARY OF INVENTION

Technical Problem

However, to perform sampling at a high speed, an analog-to-digital (AD) converter that is higher in component cost is required to be used. In addition, it is difficult to provide such high-speed AD converters in existing on-board radar apparatuses and the like in which cost reduction is demanded.

The present invention has been achieved in light of the above-described issues. An object of the present invention is to provide a technology for resolving ambiguity in detected speed without increasing the sampling speed in a radar apparatus that uses a chirp wave.

Solution to Problem

A radar apparatus of the present invention includes a first processing unit, a second processing unit, and a speed determining unit. The first processing unit uses a beat signal obtained by transmitting and receiving, a plurality of times, a predetermined first modulation wave. Furthermore, the first processing unit determines at least speed including ambiguity caused by phase folding back within a predetermined speed measurement range, from phase rotation of frequency components detected in time-series for a same target. The second processing unit uses a beat signal obtained by transmitting and receiving a predetermined second modulation wave. Furthermore, the second processing unit determines at least speed that is uniquely determined within the speed measurement range, from Doppler frequency included in frequency components indicating a target. The speed determining unit determines a measurement result for speed expressed by a resolution obtained by the first processing unit by comparing a calculation result of the first processing unit and a calculation result of the second processing unit.

As a result of a configuration such as that described above, the present invention can acquire a high-resolution measurement result for speed, without increasing the sampling speed of the beat signal.

Reference numbers within the parentheses recited the scope of claims indicate corresponding relationships with specific means according to an embodiment described hereafter as an aspect, and do not limit the technical scope of the present invention.

In addition, the present invention can be obtained through various aspects in addition to the above-described radar apparatus, such as a system of which the radar apparatus is a constituent element, a program for enabling a computer to function as the radar apparatus, and a speed measurement method.

DESCRIPTION OF EMBODIMENTS

An embodiment to which the present invention is applied will hereinafter be described with reference to the drawings.

<Overall Configuration>

Figure 1:
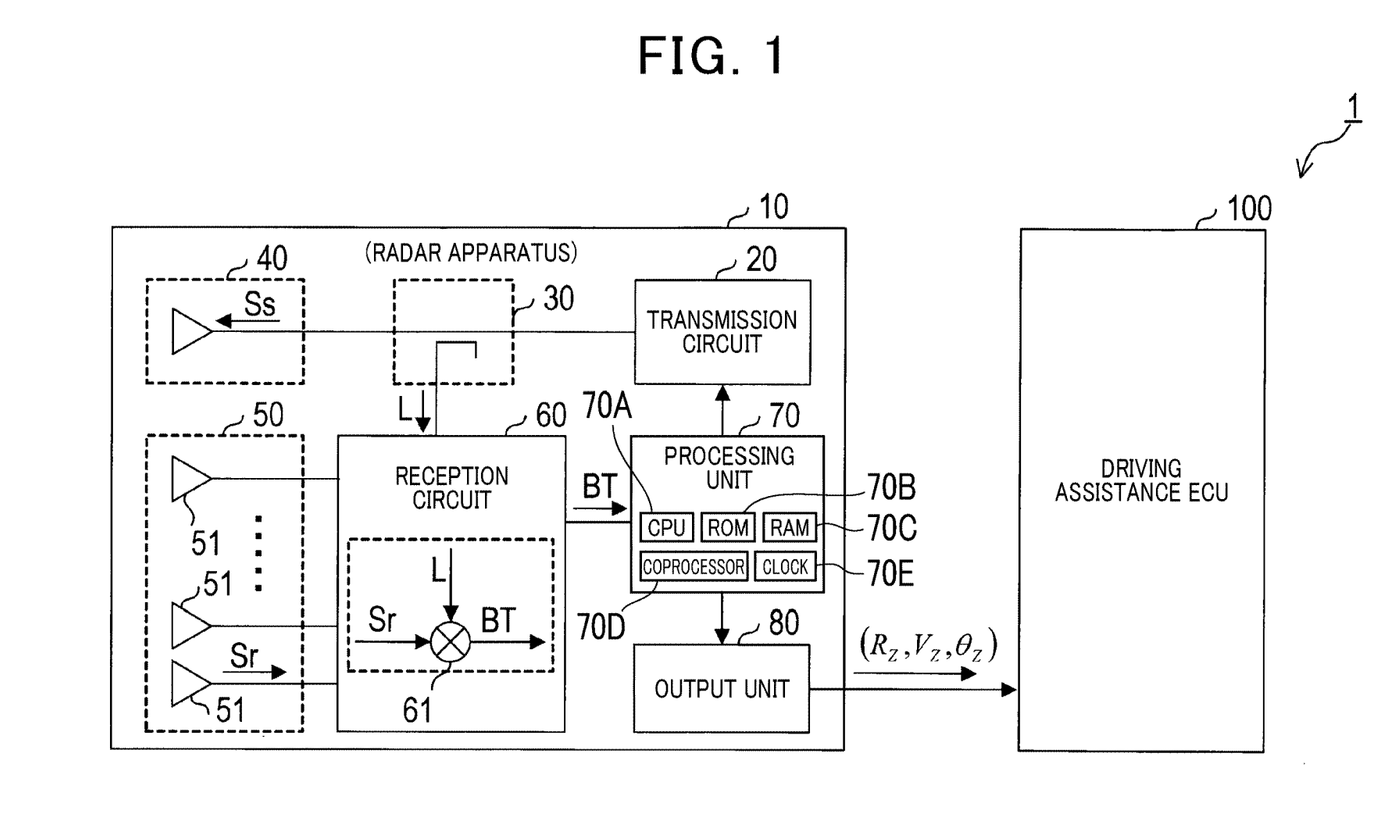
FIG. 1 is a block diagram of an overall configuration of an on-board system.

FIG. 1 shows an overall configuration of the entirety of an on-board system 1 to which a radar apparatus is applied, according to the embodiment. As shown in FIG. 1, the on-board system 1 includes a radar apparatus 10 and a driving assistance electronic control unit (ECU) 100. The on-board system 1 is mounted in a vehicle, such as a four-wheel automobile. A signal processing method of the present invention is performed by the radar apparatus. Therefore, the signal processing method will be described together with a description of the functions of the radar apparatus.

The radar apparatus 10 emits radar waves and receives reflected waves. In addition, the radar apparatus 10 observes a distance R to a target that is an object ahead that has reflected the radar waves, a speed V of the target, and an orientation θ of the target, based on a reception signal thereof. Furthermore, the radar apparatus 10 inputs observation values (Rz, Vz, and θz) to the driving assistance ECU 100.

The driving assistance ECU 100 performs various processes for assisting in driving of the vehicle by a driver, based on the observation values (Rz, Vz, and θz) of each target inputted from the radar apparatus 10. As processes related to driving assistance, for example, there is a process for displaying a warning to the driver that an approaching object is present, and a process for performing vehicle control to avoid collision with an approaching object through control of a brake system, a steering system, or the like.

The radar apparatus 10 includes a transmission circuit 20, a distributor 30, a transmission antenna 40, a reception antenna 50, a reception circuit 60, a processing unit 70, and an output unit 80.

Figure 2:
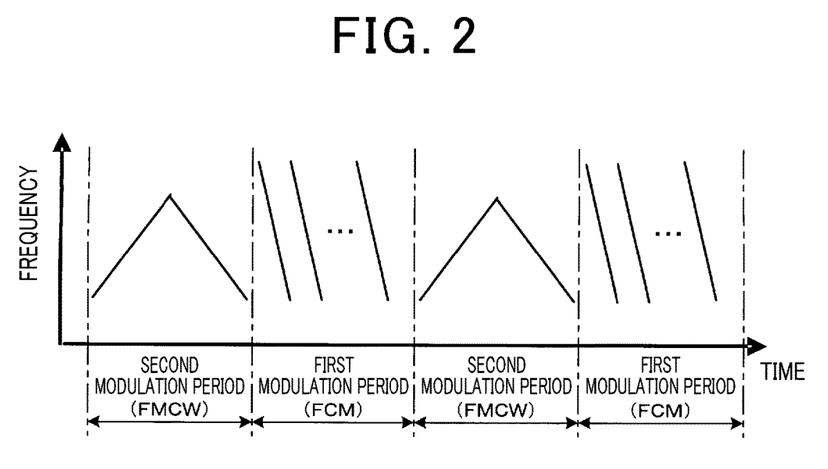
FIG. 2 is an explanatory diagram related to a modulation scheme for radar waves to be used.

The transmission circuit 20 is a circuit for supplying a transmission signal Ss to the transmission antenna 40. The transmission circuit 20 inputs a millimeter-wave-band high-frequency signal to the distributor 30 that is positioned upstream of the transmission antenna 40. Specifically, as shown in FIG. 2, the transmission circuit 20 alternately repeats a first modulation period in which a high-frequency signal (chirp) that is frequency-modulated such that the frequency changes in the shape of a sawtooth-waveform is generated a plurality of times, and a second modulation period in which a high-frequency signal (frequency-modulated continuous wave [FMCW]) that is frequency-modulated such that the frequency increases and decreases in the shape of a triangular waveform is generated. Furthermore, the transmission circuit 20 inputs the generated high-frequency signals to the distributor 30.

That is, the radar apparatus 10 operates as an FMC-type radar that transmits and receives a chirp wave (first modulated wave) during the first modulation period. In addition, the radar apparatus 10 operates as an FMCW radar that transmits and receives the FMCW (second modulated wave) during the second modulation period. A rate of change (slope of the graph in FIG. 2) of the frequency of the high frequency signal generated during the first modulation period is set to be greater than that of the frequency of the high frequency signal generated during the second modulation period. In particular, during the first modulation period, the rate of change of the frequency is set such that the frequency of a beat signal generated based on reflected waves from a target that is separated by a predetermined distance or more is a value that is sufficiently large enough that a Doppler frequency corresponding to a detection upper limit value for relative speed can be ignored. In addition, during the second modulation period, the rate of change of the frequency is set such that the speed can be uniquely identified over the overall detection range of relative speed.

As shown in FIG. 1, the distributor 30 performs power distribution of the high-frequency signal inputted from the transmission circuit 20 to a transmission signal Ss and a local signal L.

The transmission antenna 40 emits a radar wave ahead of the vehicle based on the transmission signal Ss supplied from the distributor 30. The radar wave has a frequency that corresponds to the transmission signal Ss.

The reception antenna 50 is an antenna for receiving a radar wave (reflected wave) reflected by a target. The reception antenna 50 is configured as a linear array antenna in which a plurality of antenna elements 51 are arrayed in a single row. A reception signal Sr of the reflected wave from each antenna element 51 is inputted to the reception circuit 60.

The reception circuit 60 processes the reception signal Sr inputted from each antenna element 51 configuring the reception antenna 50. Furthermore, the reception circuit 60 generates and outputs a beat signal BT for each antenna element 51. Specifically, for each reception element 51, the reception circuit 60 mixes the reception signal Sr inputted from the antenna element 51 and the local signal L inputted from the distributor 30 using a mixer 61, and thereby generates and outputs the beat signal BT for each antenna element 51.

However, the process until the beat signal BT is outputted includes a process for amplifying the reception signal Sr, a process for removing unnecessary signal components from the beat signal BT, and a process for converting the beat signal BT to digital data. In this way, the reception circuit 60 converts the generated beat signal BT for each antenna element 51 to digital data and outputs the digital data. The outputted beat signal BT for each antenna element 51 is inputted to the processing unit 70. Hereafter, A/D conversion data of the beat signal BT acquired during the first modulation period is referred to as first modulation data, and A/D conversion data of the beat signal BT acquired during the second modulation period is referred to as second modulation data.

The processing unit 70 is composed of a known microcomputer that includes a central processing unit (CPU) 70A that functionally performs various means related to the present invention, a read-only memory (ROM) 70B that serves as a recording medium, a random access memory (RAM) 70C, a coprocessor 70D that performs a fast Fourier transformation (FFT) process and the like, and a clock 70E. The ROM 70B stores therein, in advance, codes expressing various programs (such as a target detection process) described hereafter. Therefore, the CPU 70A is configured to be capable of calling up a program stored in the ROM 70B to a work area thereof and running the program. In addition, the RAM 70C is used to temporarily store data when the CPU 70A is performing a process. The coprocessor 70D handles fast Fourier transformation as a dedicated process, as described hereafter. The clock 70E generates a clock signal for operation.

In this way, the processing unit 70 analyzes the beat signal BT for each antenna element 51, and thereby performs the various processes that are provided, including the target detection process for calculating the observation values (Rz, Vz, and θz) for each target that reflects the radar waves.

<Target Detection Process>

The target detection process performed by the processing unit 70 (that is, the CPU 70A) will be described with reference to a flowchart in FIG. 3.

The present process is repeatedly performed when the on-board system 1 is started.

When the present process is started, at S110, the processing unit 70 determines whether or not acquisition of the second modulation data (that is, the beat signals of the FMCW) is completed. When acquisition of the second modulation data is not completed, the processing unit 70 waits by repeating the same step. In addition, when acquisition of the second modulation data is completed, the processing unit 70 proceeds to S120.

At S120, the processing unit 70 performs FFT processing (frequency analysis processing) of the second modulation data and generates a power spectrum, for each antenna element 51 and for each up-chirp and down-chirp. The power spectrum indicates the power of the reflected wave in each frequency bin.

At S130, the processing unit 70 calculates an average power spectrum that is the average of the power spectrums for each up-/down-chirp. Furthermore, the processing unit 70 extracts a peak (identified by the frequency bin) at which the power is equal to or greater than a predetermined peak detection threshold, from the average power spectrum.

At S140, the processing unit 70 performs a pair-matching process to combine peaks, of the peaks in the up-chirp and the peaks in the down-chirp, based on reflected waves from the same target. A specific method for performing the pair-matching process varies and is a known technique. Therefore, a description thereof is omitted.

At S150, the processing unit 70 calculates the distance and the relative speed using a method known in FMCW radars, based on the frequencies of the two peaks combined in the pair-matching process.

At S160, the processing unit 70 determines whether or not acquisition of the first modulation data is completed. When acquisition of the first modulation data is not completed, the processing unit 70 waits by repeating the same step. In addition, when acquisition of the second modulation data is completed, the processing unit 70 proceeds to S170.

At S170, the processing unit 70 performs a two-dimensional FFT on the first modulation data. Specifically, as shown in FIG. 4, first, the processing unit performs a first FFT process (frequency analysis process) and generates a power spectrum for each chirp. Next, the processing unit 70 collects the processing results of all chirps for each frequency bin, and performs a second FFT process. The frequencies of the beat signals (the components that form peaks in a power spectrum) detected in each chirp by the reflected waves from the same target are all the same. However, when the target and the own vehicle have relative speed, the phase of the beat signal slightly differs with each chirp. That is, from the result of the second FFT process, a power spectrum in which the frequency component based on the above-described rotation speed of phase is the frequency BIN (speed bin) is determined for each frequency BIN (distance BIN) acquired as the result of the first FFT process. Hereafter, the power spectrum is referred to as a two-dimensional power spectrum.

At S180, the processing unit 70 extracts a peak from the two-dimensional power spectrum. At subsequent S190, the processing unit calculates the distance and speed from the distance BIN and speed BIN of the extracted peak.

At S200, the processing unit 70 compares the distances and speeds based on the same target determined at S150 and S190, and thereby performs a process to determine the distance and the speed. At subsequent S210, the processing unit 70 inputs, to the driving assistance ECU 100 via the output unit 80, a combination of the process result (Rz, Vz) and an orientation θz of the target separately determined using either of the first modulation data and the second modulation data as the measurement result (Rz, Vz, θz). As a result, the processing unit 70 ends the present process.

<Distance and Speed Determining Process>

Figure 5:
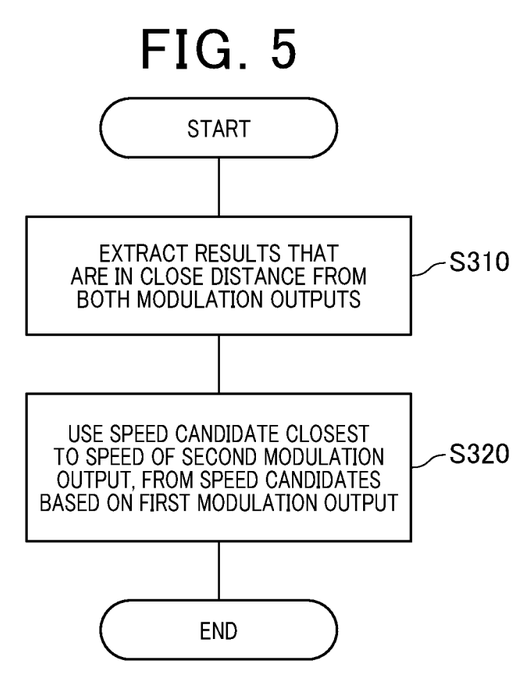
FIG. 5 is a flowchart of a distance and speed determining process.

The distance and speed determining process performed by the processing unit 70 at S200 will be described with reference to FIG. 5.

In the present process, at S310, the processing unit 70 compares the calculation results for distance and speed based on the second modulation data, and the calculation results for distance and speed based on the first modulation data. Furthermore, in the present process, the processing unit 70 combines the calculation results that are in close distance and extracts the combinations.

At S320, for each extraction result at S310, from the calculation result for speed based on the first modulation data, that is, speed including ambiguity caused by phase folding back, the processing unit 70 determines a plurality of speeds within a speed detection range corresponding thereto. Furthermore, from the plurality of speeds, the processing unit 70 selects the speed closest to the calculation result for speed based on the second modulation data as a true value. As a result, the processing unit 70 uses the value as the speed of an object present at the distance of interest and ends the present process.

<Operation>

Figure 6:
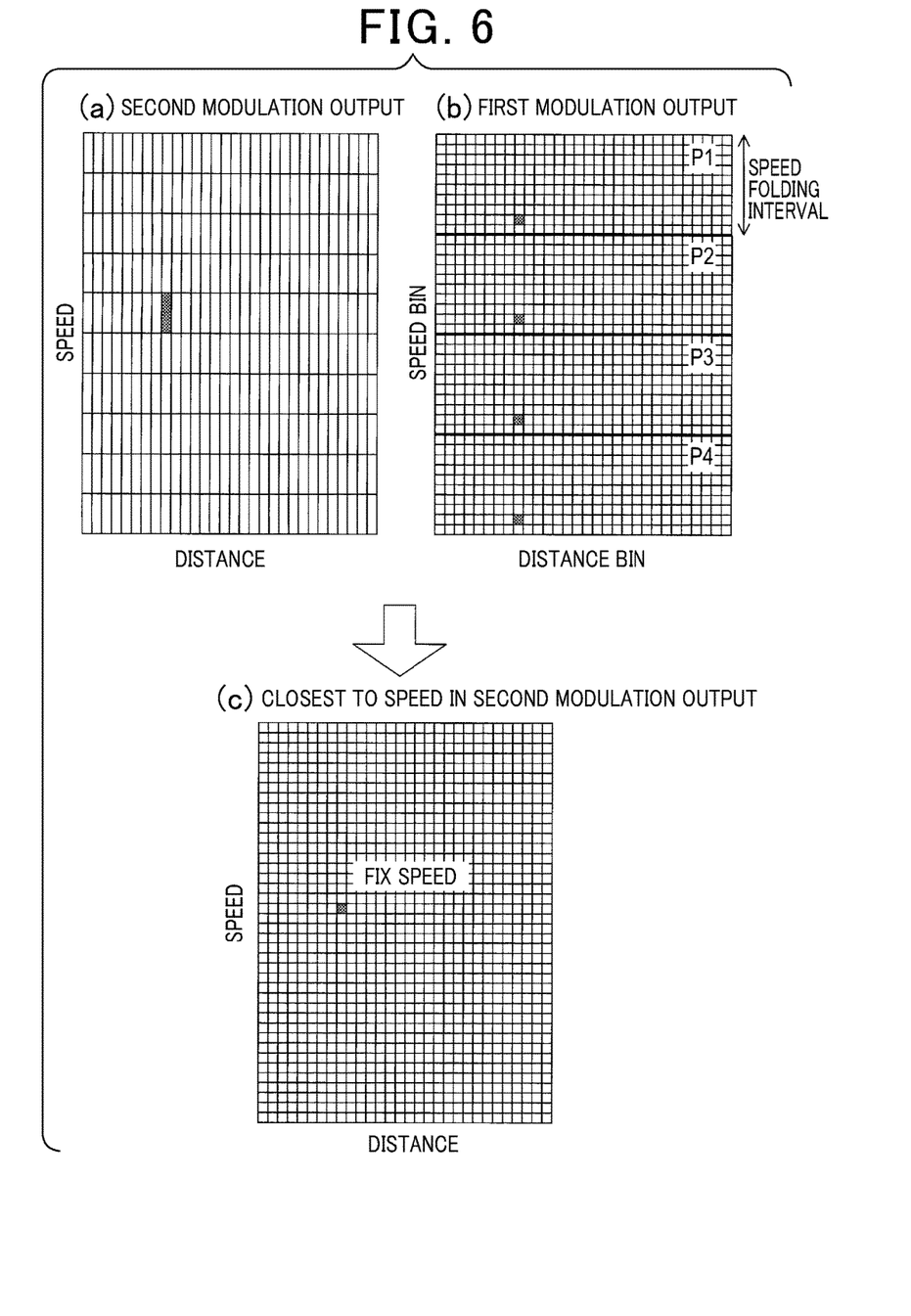
FIG. 6 is an explanatory diagram of a determining method for speed.

Here, FIG. 6(*a*) is an example of the calculation result (second modulation output) for distance and speed based on the second modulation data. In addition, FIG. 6(*b*) is an example of the calculation result (first modulation output) for distance and speed based on the first modulation data. As shown in FIG. 6, the distance resolutions are both similar. The speed resolution is higher in the first modulation output than the second modulation output. However, the second modulation output enables the speed to be uniquely determined over the overall speed measurement range. The first modulation output has ambiguity resulting caused by phase folding back (four fold back portions P1 to P4 occur within the speed measurement range in FIG. 6). Therefore, the speed cannot be uniquely determined. Here, through comparison of speed between those of the same distance, as shown in FIG. 6(*c*), the speed closest to the speed in the second modulation output (here, the speed within the fold back portion P2), of the plurality of speeds determined from the first modulation output, is used as the speed of the target.

Effect

As described above, according to the present embodiment, the speed is determined (speed ambiguity is resolved) through comparison of the first modulation output in which resolution is high but the speed cannot be uniquely determined, and the second modulation output in which resolution is low but the speed can be uniformly determined. Therefore, according to the present embodiment, a high-resolution measurement result for speed can be acquired without increasing the speed for sampling of the beat signal. As a result, the reliability of speed detection in the radar apparatus 10 can be improved.

Figure 3:
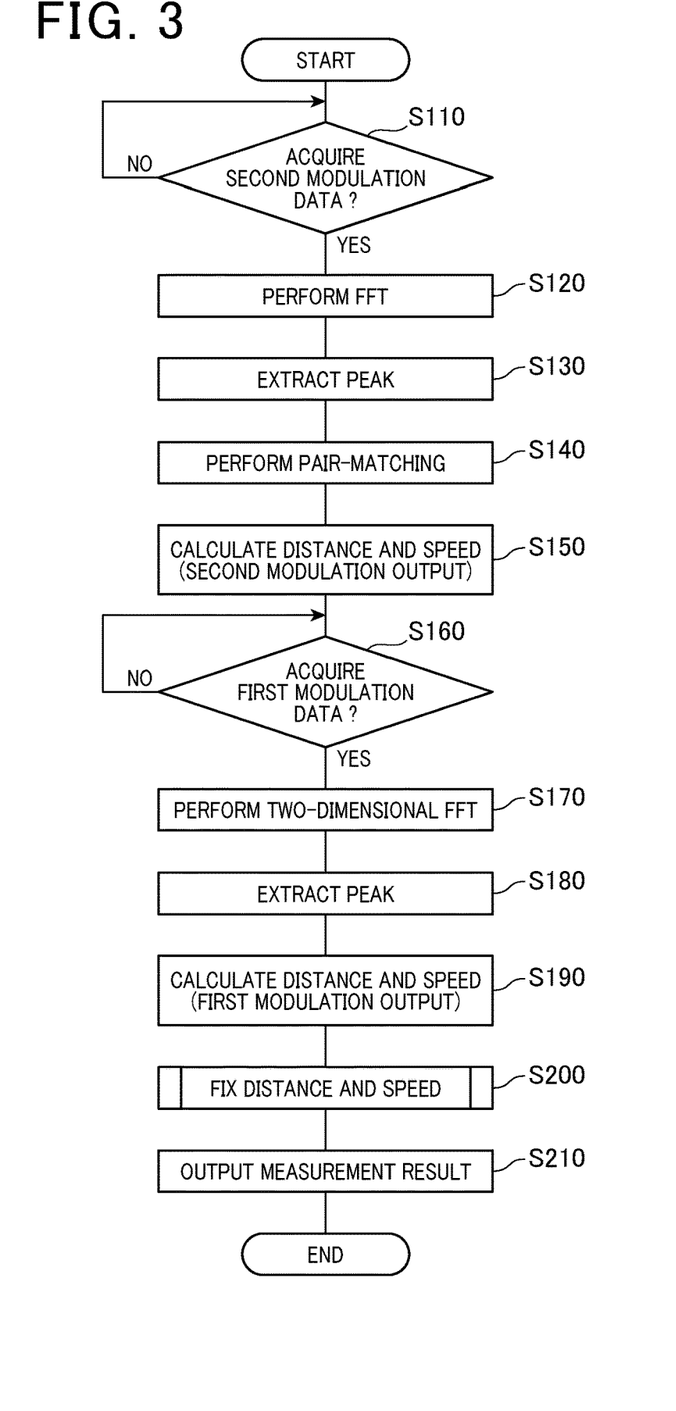
FIG. 3 is a flowchart of a target detection process performed by a processing unit.
Figure 4:
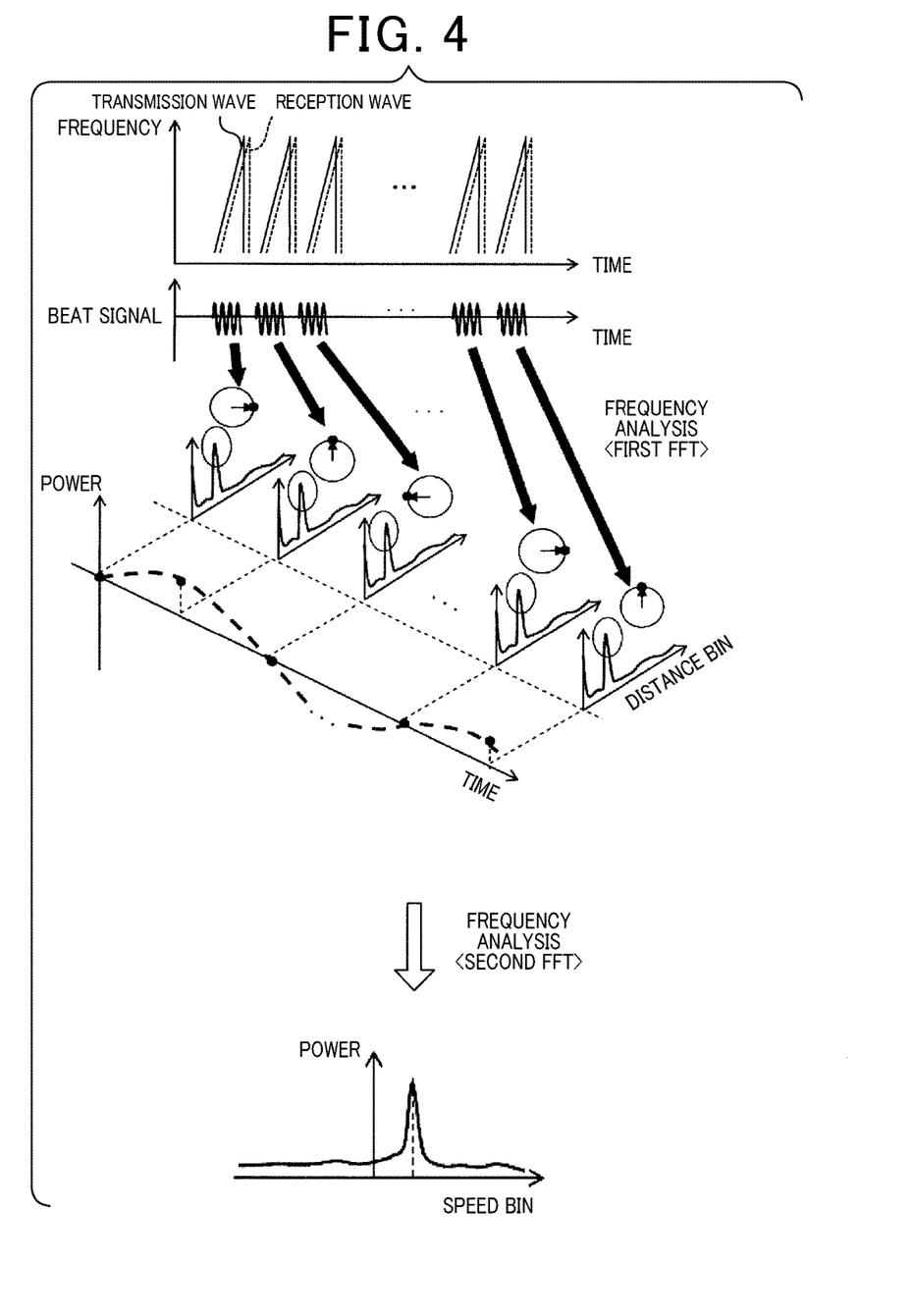
FIG. 4 is an explanatory diagram of an overview of two-dimensional fast Fourier transformation (FFT)

According to the present embodiment, a first processing means is functionally configured by steps S160 to S190 shown in FIG. 3. In addition, steps S160 to S190 correspond to a first process. Furthermore, a second processing means is functionally configured by steps S110 to S150 shown in FIG. 3. In addition, steps S110 to S150 correspond to a second process. Furthermore, a speed determining means is functionally configured by step S200 shown in FIG. 3. In addition, step S200 corresponds to a speed determining process.

Other Embodiments

An embodiment of the present invention is described above. However, the present invention is not limited to the above-described embodiment. Various embodiments may be used.

(1) According to the above-described embodiment, the FMCW is used as the second modulation data. However, according to the above-described embodiment, all that is required is that the speed can be measured using Doppler frequency and, for example, a multi-frequency CW may be used.

(2) Each constituent element of the present invention is conceptual and is not limited to the above-described embodiments. For example, a function provided by a single constituent element may be dispersed among a plurality of constituent elements. Functions provided by a plurality of constituent elements may be integrated in a single constituent element. In addition, at least a part of a configuration according to the above-described embodiments may be replaced by a publicly known configuration having a similar function. Furthermore, at least a part of a configuration according to an above-described embodiment may be added to or replace another configuration according to another above-described embodiment.

REFERENCE SIGNS LIST

1: on-board system
10: radar apparatus
20: transmission circuit
30: distributor
40: transmission antenna
50: reception antenna
51: antenna element
60: reception circuit
61: mixer
70: processing unit
70A: CPU
70B: ROM
70C: RAM
70D: coprocessor
70E: clock
80: output unit
100: driving assistance ECU

The invention claimed is:

1. A radar apparatus comprising:
a first processing unit for determining at least speed including ambiguity caused by phase folding back within a predetermined speed measurement range, from phase rotation of frequency components detected in time-series for a same target, using a beat signal obtained by transmitting and receiving, a plurality of times, a predetermined first modulation wave;
a second processing unit for determining at least speed that is uniquely determined within the speed measurement range, from Doppler frequency included in frequency components indicating a target, using a beat signal obtained by transmitting and receiving a predetermined second modulation wave; and
a speed determining unit for determining a measurement result for speed expressed by a resolution obtained by the first processing unit by comparing a calculation result of the first processing unit and a calculation result of the second processing unit.

2. The radar apparatus according to claim 1, wherein:
the first processing unit uses a chirp wave of which a frequency continuously increases or decreases as the first modulation wave.

3. The radar apparatus according to claim 2, wherein:
the first processing unit and the second processing unit determine a distance to a target; and
the speed determining unit compares, in the calculation result of the first processing unit and the calculation result of the second processing unit, those of which the distance to the target is the same, and uses, from a plurality of speeds that are determined taking into consideration phase folding back from the calculation result of the first processing unit, the speed closest to the calculation result of the second processing unit as a true value.

4. The radar apparatus according to claim 2, wherein:
the second processing unit uses a frequency-modulated continuous wave or a multi-frequency continuous wave as the second modulation wave.

5. The radar apparatus according to claim 4, wherein:
the first processing unit and the second processing unit determine a distance to a target; and
the speed determining unit compares, in the calculation result of the first processing unit and the calculation result of the second processing unit, those of which the distance to the target is the same, and uses, from a plurality of speeds that are determined taking into consideration phase folding back from the calculation result of the first processing unit, the speed closest to the calculation result of the second processing unit as a true value.

6. The radar apparatus according to claim 1, wherein:
the second processing unit uses a frequency-modulated continuous wave or a multi-frequency continuous wave as the second modulation wave.

7. The radar apparatus according to claim 6, wherein:
the first processing unit and the second processing unit determine a distance to a target; and
the speed determining unit compares, in the calculation result of the first processing unit and the calculation result of the second processing unit, those of which the distance to the target is the same, and uses, from a plurality of speeds that are determined taking into consideration phase folding back from the calculation result of the first processing unit, the speed closest to the calculation result of the second processing unit as a true value.

8. The radar apparatus according to claim 1, wherein:
the first processing unit and the second processing unit determine a distance to a target; and
the speed determining unit compares, in the calculation result of the first processing unit and the calculation result of the second processing unit, those of which the distance to the target is the same, and uses, from a plurality of speeds that are determined taking into consideration phase folding back from the calculation result of the first processing unit, the speed closest to the calculation result of the second processing unit as a true value.

9. A signal processing method for performing signal processing in a radar apparatus, the signal processing method comprising:
- a first process in which at least speed including ambiguity caused by phase folding back within a predetermined speed measurement range is determined from phase rotation of frequency components detected in time-series for a same target, using a beat signal obtained by a predetermined first modulation wave being transmitted and received a plurality of times;
- a second process in which at least speed that is uniquely determined within the speed measurement range is determined from Doppler frequency included in frequency components indicating a target, using a beat signal obtained by a predetermined second modulation wave being transmitted and received; and
- a speed determining process in which a measurement result for speed expressed by a resolution obtained in the first process is determined by a calculation result of the first process and a calculation result of the second process being compared.

\* \* \* \* \*